(12) United States Patent
Wang et al.

(10) Patent No.: US 11,437,666 B2
(45) Date of Patent: Sep. 6, 2022

(54) BATTERY MODULE INCLUDING SIDE PRESSURE PLATES AND POUCH CELL MODULES

(71) Applicant: KARMA AUTOMOTIVE LLC, Irvine, CA (US)

(72) Inventors: Yangfan Wang, Aliso Viejo, CA (US); Jing Hong, Trabuco Canyon, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 16/528,147

(22) Filed: Jul. 31, 2019

(65) Prior Publication Data
US 2021/0036389 A1  Feb. 4, 2021

(51) Int. Cl.
*H01M 10/647* (2014.01)
*H01M 10/613* (2014.01)
*H01M 10/625* (2014.01)
*H01M 10/6554* (2014.01)
*H01M 10/04* (2006.01)
(Continued)

(52) U.S. Cl.
CPC ..... *H01M 10/647* (2015.04); *H01M 10/0413* (2013.01); *H01M 10/613* (2015.04); *H01M 10/625* (2015.04); *H01M 10/6554* (2015.04); *H01M 50/116* (2021.01); *H01M 50/148* (2021.01); *H01M 50/502* (2021.01); *H01M 50/578* (2021.01); *H01M 2220/20* (2013.01)

(58) Field of Classification Search
CPC ............. H01M 10/647; H01M 10/613; H01M 10/625; H01M 10/6554; H01M 10/0413; H01M 50/502; H01M 50/116; H01M 50/578; H01M 50/148

USPC ......................... 429/120, 156, 158, 159, 160
See application file for complete search history.

(56) References Cited

U.S. PATENT DOCUMENTS

| 9,705,156 B2 | 7/2017 | Dorsch | |
| 2007/0184341 A1* | 8/2007 | Yoon | H01M 50/10 429/152 |

(Continued)

FOREIGN PATENT DOCUMENTS

| CN | 208336332 U | 1/2019 |
| DE | 102014018942 A1 * | 6/2016 |

(Continued)

OTHER PUBLICATIONS

"Top." Merriam-Webster.com Dictionary, Merriam-Webster, https://www.merriam-webster.com/dictionary/top. Accessed Jun. 7, 2021. (Year: 2021).*

(Continued)

*Primary Examiner* — Sean P Cullen
(74) *Attorney, Agent, or Firm* — Honigman LLP

(57) ABSTRACT

A battery module made from a plurality of side-by-side pouch cell modules, wherein each pouch cell module is formed with a pair of cells on either side of an insulation pad with the cells in turn positioned between first and second metal brackets such that each cell contacts an insulation pad on one side and a metal bracket on the other. Also included are a pair of pressure plates at the ends of the stack of side-by-side pouch cells and a compression band wrapping around the plurality of side-by-side pouch cells and the pressure plates. A busbar electrically connects the plurality of side-by-side pouch cells together.

20 Claims, 6 Drawing Sheets

(51) Int. Cl.
  *H01M 50/116* (2021.01)
  *H01M 50/148* (2021.01)
  *H01M 50/502* (2021.01)
  *H01M 50/578* (2021.01)

(56) References Cited

U.S. PATENT DOCUMENTS

| | | | | |
|---|---|---|---|---|
| 2010/0255351 | A1* | 10/2010 | Ijaz | H01M 10/0481 429/7 |
| 2011/0059347 | A1* | 3/2011 | Lee | H01M 10/6551 429/120 |
| 2012/0183840 | A1* | 7/2012 | Lee | H01M 50/20 429/158 |
| 2015/0099146 | A1 | 4/2015 | Kim et al. | |
| 2017/0077559 | A1* | 3/2017 | Beaston | H01M 10/4257 |
| 2017/0125774 | A1* | 5/2017 | Choi | H01M 50/543 |

FOREIGN PATENT DOCUMENTS

| | | |
|---|---|---|
| KR | 10-2012-0074426 A | 7/2012 |
| KR | 10-2015-0113827 A | 10/2015 |

OTHER PUBLICATIONS

"Bottom." Merriam-Webster.com Dictionary, Merriam-Webster, https://www.merriam-webster.com/dictionary/bottom. Accessed Jun. 7, 2021. (Year: 2021).*

International Search Report and Written Opinion dated Nov. 19, 2020 issued in related International Patent Application No. PCT/US2020/044540; filed Jul. 31, 2020.

* cited by examiner

BATTERY MODULE INCLUDING SIDE PRESSURE PLATES AND POUCH CELL MODULES

TECHNICAL FIELD

The present application relates to systems for holding battery pouch cells together as a unit for use in electric vehicles and to systems that remove heat from such pouch cell units so as to enhance battery performance.

BACKGROUND

The battery power source used in electric vehicles such as, for example, automobiles, typically comprises a large number of individual battery pouch cell modules in close contact with one another. Pouch cells provide optimal use of space and packaging efficiencies. Unfortunately, a major problem with stacking these electric vehicle battery pouch cells close together is the heat generated by the individual battery cells. Battery overheating causes problems. First, it results in overall power efficiency being compromised. Second, such overheating also presents safety concerns.

Unfortunately, efficiently removing heat from electric vehicle battery cells has proven to be difficult. One existing solution to this problem has been to use a cooling gel in the battery module. In this approach, the thermal glue or gel is applied inside of the bottom enclosure to remove heat from the bottom enclosure. This typically results in a large temperature difference across the cell perpendicular to the cooling surface because the glue or gel is only at the bottom of the enclosure. Another approach has been to hold the individual battery cells together in a plastic frame and then to cool the plastic frame together with a cooling foam. This is not cost effective and has a high risk of liquid leaking inside the module. It would instead be desirable to provide a system of enhanced electric vehicle battery cooling for battery cells stacked close together that provides better temperature control at a lower cost. In addition, it would be desirable to provide a battery cell stacking system that physically protects the individual battery cells.

SUMMARY

In accordance with the present application, a system for holding together a plurality of electric vehicle battery pouch cells is disclosed herein. As will be shown, the present system both protects the individual cells and also efficiently removes heat from them. In a preferred aspect, the present system comprises: (a) a plurality of pouch cell modules positioned together side-by-side, wherein each pouch cell module comprises: (i) a first bracket, (ii) a second bracket, (iii) a pair of battery cells positioned between the first and second brackets, and (iv) an insulation pad positioned between the pair of battery cells; (b) a pair of pressure plates, with one pressure plate disposed on each side end of the battery module; (c) at least two compression bands wrapped around the plurality of side-by-side pouch cells and the end pressure plates; and (d) a busbar electrically connecting the plurality of side-by-side pouch cell modules together. Preferably also included are a top cover spanning across the tops of the plurality of side-by-side pouch cell modules; and a bottom cover spanning across the bottoms of the plurality of side-by-side pouch cell modules.

In preferred embodiments, each of the parallel connected cells in the pouch cell modules have top and bottom tabs that are fastened together. A busbar is then welded to the top and bottom tabs of the cell modules to provide electric communication between all of the cells.

In preferred embodiments, each individual pouch cell module's first bracket has longitudinally extending side edges and the second bracket is positioned between (i.e.: received within) the longitudinally extending side edges of the first bracket. As such, a pouch cell module is provided with two battery cells held between the first and second brackets with the insulation pad positioned between these two cells. As a result, each individual battery cell has one face in contact with a metal bracket and the other face in contact with an insulation pad. This pattern is repeated across the length of the overall assembly as the pouch cell modules are stacked together side-by-side. This novel design offers enhanced cooling benefits since every battery cell in the assembly is in direct physical contact with a metal bracket on one side. This allows excess heat to be quickly and efficiently conducted away from the battery cells. Additionally, having the insulation pad positioned between the cells keeps the excess heat from each individual battery cell directed away from the insulation pad and into one of the adjacent metal brackets. To assist with heat conduction, the first and second brackets may preferably be made of aluminum, and to prevent heat transmission, the insulation pad may be made of a thermally insulating material having a low thermal conductivity.

Preferably as well, the top and bottom covers of the device may have edges that wrap around the top and bottom ends of the plurality of pouch cell modules and the first brackets may have notches therein for the compression band to be received therein as it wraps around the full assembly.

A first advantage of the present system is that it provides enhanced cooling performance by conducting heat away from each battery cell, as each battery cell is in contact with one or the other of the module's first and second metal brackets.

A second advantage of the present system is that there is no possibility for coolant leakage in the modules (as compared to existing systems that circulate a cooling fluid through a cold plate between the individual cells).

A third advantage of the present system is that it's design is completely modular. As such, different numbers of pouch cell modules can be stacked together side-by-side with the present system operating the same way in each of its various arrangements (i.e.: with more or fewer pouch cells). As a result, more pouch cell modules may be added, or pouch cell modules removed from the system, all depending upon user requirements.

A fourth advantage of the present system is that it can be used with different pouch cell wirings such as pouch cells can be wired together in 3S8P (i.e.: 3 batteries in series, 8 batteries in parallel) or 3P12S (i.e.: 3 batteries in series, 12 batteries in parallel), 6P8S (i.e.: 6 batteries in parallel, 8 batteries in series) and or any other desired configuration.

A fifth advantage of the present system is that it provides structural protection to the battery cells. Specifically, its metal brackets are much stiffer than comparable plastic frames which had been used in existing foam designs. Additionally, the present brackets will not cause any internal leaking of coolant.

DETAILED DESCRIPTION

Figure 1:
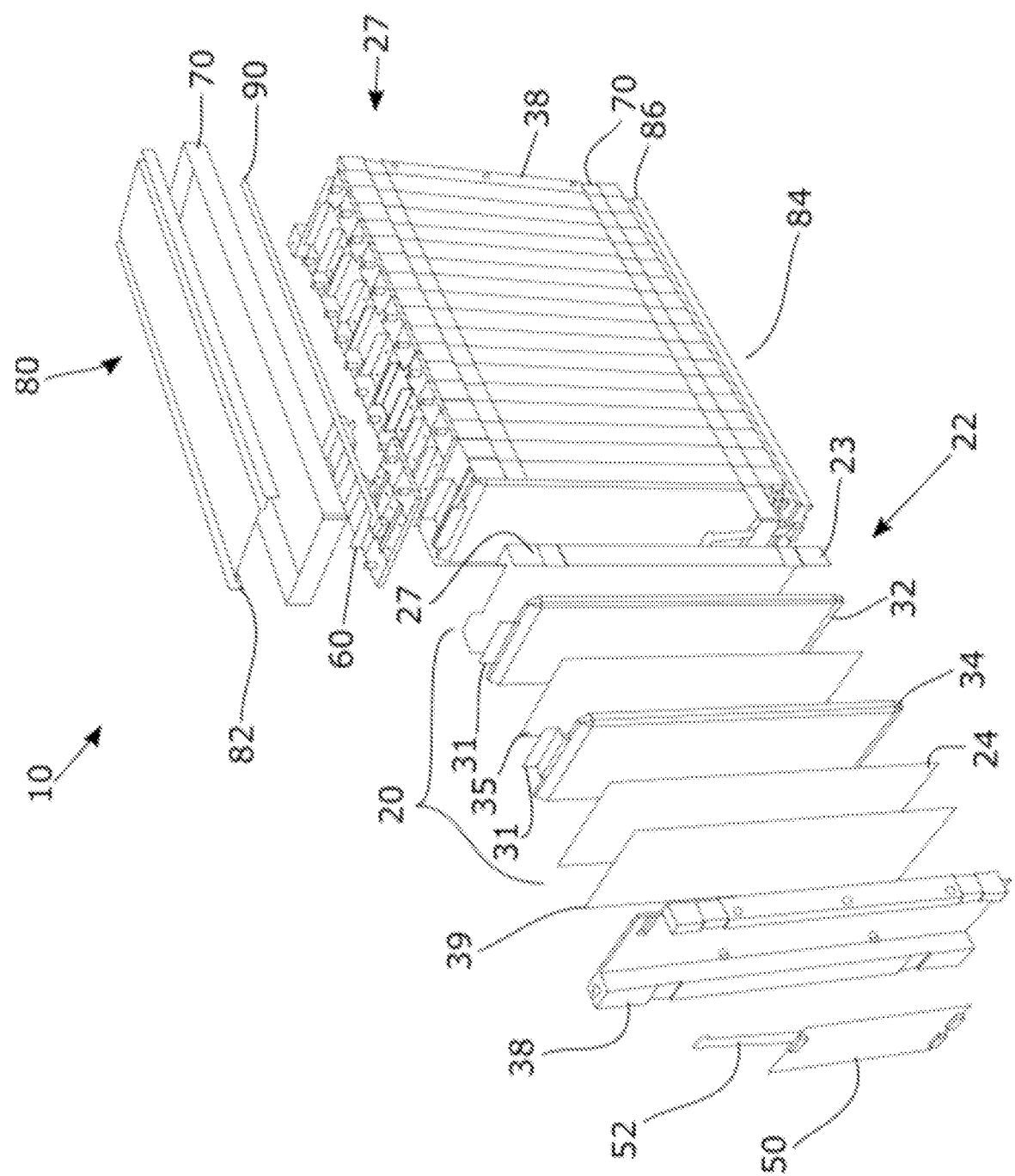
FIG. 1 is a partially exploded perspective view of the present system.
Figure 2:
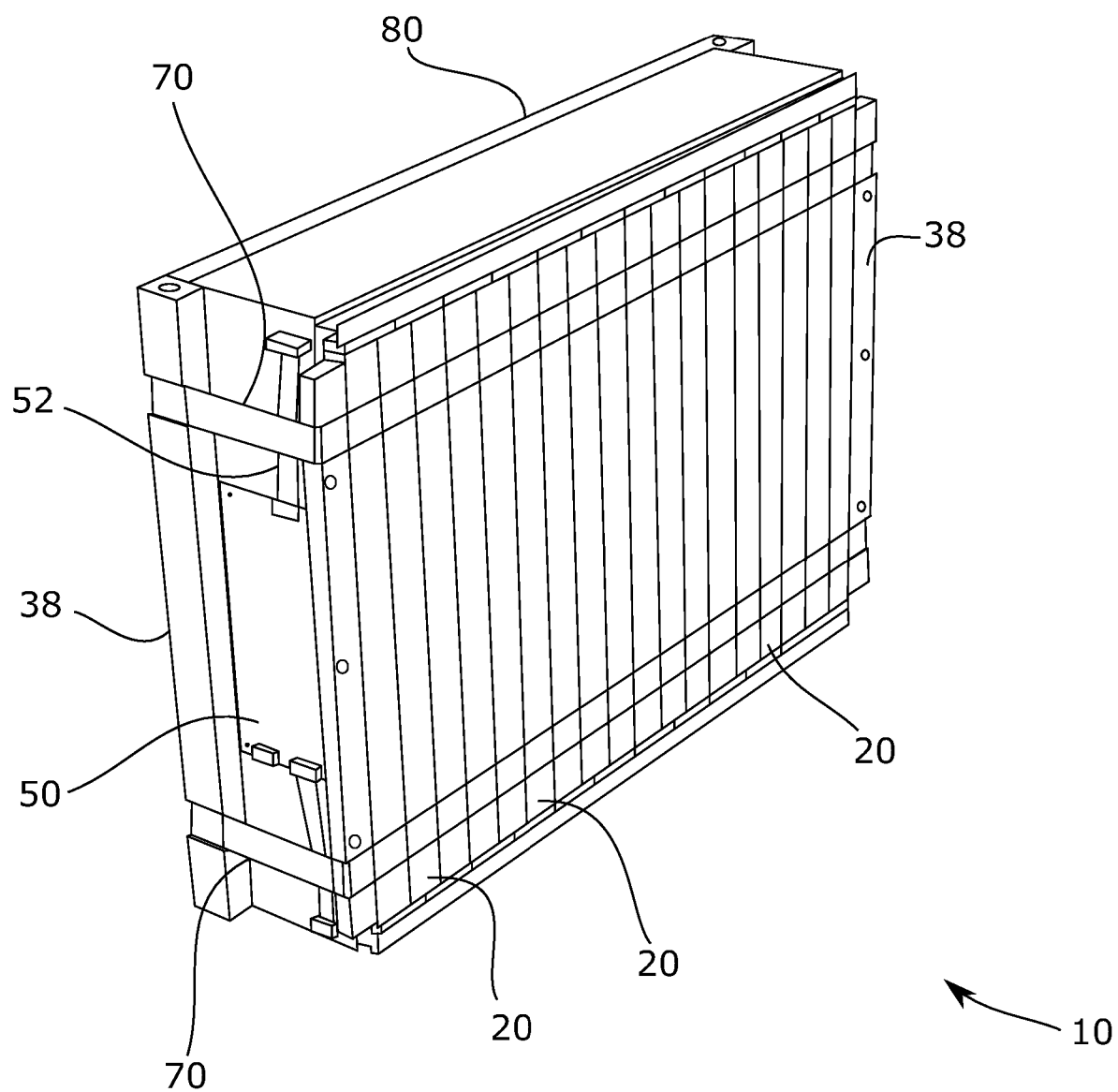
FIG. 2 is an assembled perspective view corresponding to FIG. 1.

As shown in FIGS. 1 and 2, a battery module 10 is provided. Module 10 comprises a plurality of pouch cell modules 20 positioned together side-by-side. Each pouch cell module 20 comprises a first bracket 22 and a second bracket 24. A pair of pouch cells 32 and 34 is positioned between the first and second brackets 22 and 24. An insulation pad 35 is positioned between cells 32 and 34, as shown. In operation, brackets 22 and 24 provide strong structural support at the sides of cells 32 and 34. In addition, brackets 22 and 24 are preferably made from a highly thermally conductive material which may optionally be aluminum to efficiently conduct excess heat away from cells 32 and 34. Preferably as well, cells 32 and 34 have large side surface areas (see FIG. 3) which directly contact brackets 22 and 24 so as to ensure efficient thermal energy transfer. As can also be seen, each individual battery cell (i.e.: every cell 32 or 34) in each pouch cell module 20 in overall system module 10 is in direct physical contact with a metal bracket (either 22 or 24) such that heat can be quickly and efficiently conducted away from the cells. Preferably, first and second brackets 22 and 24 are made of aluminum, or other suitable highly thermally conductive material, and the insulation pad is preferably made of low thermal conductivity material, or any suitable insulating material.

A pressure plate 38 is provided on each of the two side ends of battery module 10. An optional insulation pad 39 may be provided adjacent to each pressure plate 38 to prevent overheating at the lateral ends of the device module 10. An optional slave board or module control unit 50 can be attached to pressure plate 38 by a harness 52. Slave board 50 can optionally be used to measure cell voltage and temperature and communicate this information with a battery management unit.

Figure 3:
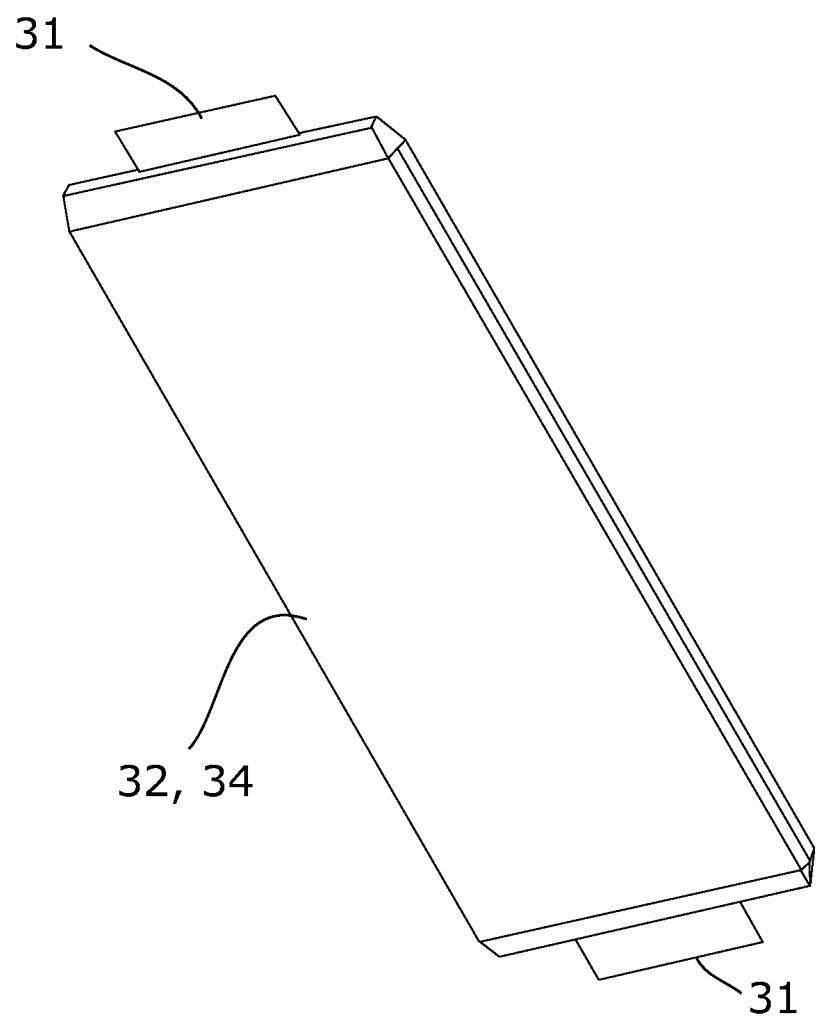
FIG. 3 is a perspective view of one of the individual battery cells.

A busbar 60 is provided to electrically connect each of the plurality of side-by-side pouch cell modules 20 together. As best seen in FIG. 3, each of cells 32 and 34 may have top and bottom tabs 31 extending therefrom, and the top and bottom tabs are fastened together. Specifically, this placement also keeps each of cells 32 and 34 in direct physical contact with insulation pad 35. It also assists in holding the whole pouch cell module 20 together as busbar 60 is also electrically and preferably physically connected to tabs 31. In preferred embodiments, busbar 60 is ultrasonically welded to the top tabs 31 of the cells 32 and 34.

As can also be seen in FIG. 1, first bracket 22 may have longitudinally extending side edges 23 that are received around second bracket 24 such that cells 32 and 34 together with insulation pad 35 are all positioned between the longitudinally extending side edges 23 of first bracket 22. This has the advantage of providing structural stability to each pouch cell module 20.

In preferred aspects, at least one compression band 70 is wrapped around the plurality of side-by-side pouch cell modules 20 and the pair of pressure plates 38. In one preferred aspect, the longitudinally extending side edges 23 of the first brackets 22 all have notches 27 therein such that the compression band 70 can be is received into the notches, thereby holding the full assembly together. To further provide structural stability, also provided are an optional top cover 80 spanning across the tops of the plurality of side-by-side pouch cell modules 20 and an optional bottom cover 84 spanning across the bottoms of the plurality of side-by-side pouch cell modules 20. Top cover 80 preferably has downwardly extending edges 82 that wrap around top ends of each of the plurality of pouch cell modules 20, and the bottom cover 84 preferably has upwardly extending edges 86 that wrap around bottom ends of each of the plurality of pouch cell modules 20. As can be seen, the at least one compression bands 70 preferably comprises an upper compression band and a lower compression band both wrapping around the plurality of side-by-side pouch cells 32/34 (and also wrapping around the two end pressure plates 38). It is to be understood, however, that any number of compression bands 70 may be provided as desired. In addition, such compression bands may be thin and only cover only a small portion of the device, or may be wide and cover a large or very large portion of the surfaces longitudinally extending side edges 23.

It is to be understood that the present system is not limited to any particular wiring arrangements for electrically connecting together the individual batteries used in each of cells 32 and 34. For example, the present system can be used with different pouch cell wiring designs such as pouch cells wired together in 3S4P (i.e.: 3 batteries in series, 4 batteries in parallel) or 3P12S (i.e.: 3 batteries in series, 12 batteries in parallel), 6P8S (i.e.: 6 batteries in parallel, 8 batteries in series) and or any other desired configuration.

In optional embodiments, a voltage and temperature sensing board 90 can be positioned in electrical communication with each of the plurality of side-by-side pouch cell modules 20. Voltage and temperature sensing board 90 can optionally measure the voltage from each cell group and the temperature at several locations. These signals can then be communicated to a master battery management unit (not shown) for processing.

Figure 4:
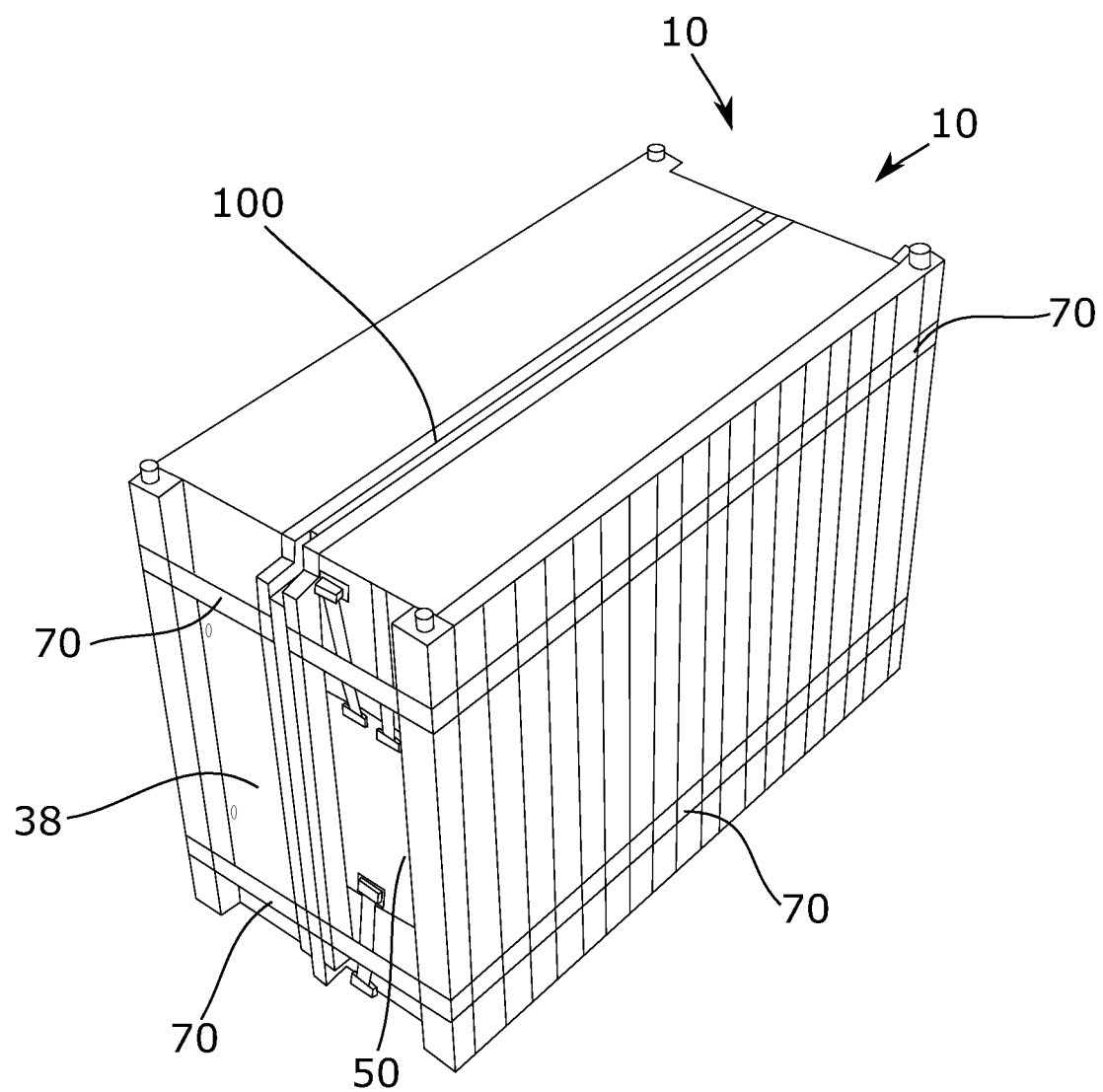
FIG. 4 is a perspective view of a pair of the systems of FIGS. 1 and 2 positioned side-by-side and separated by a cooling plate.
Figure 5:
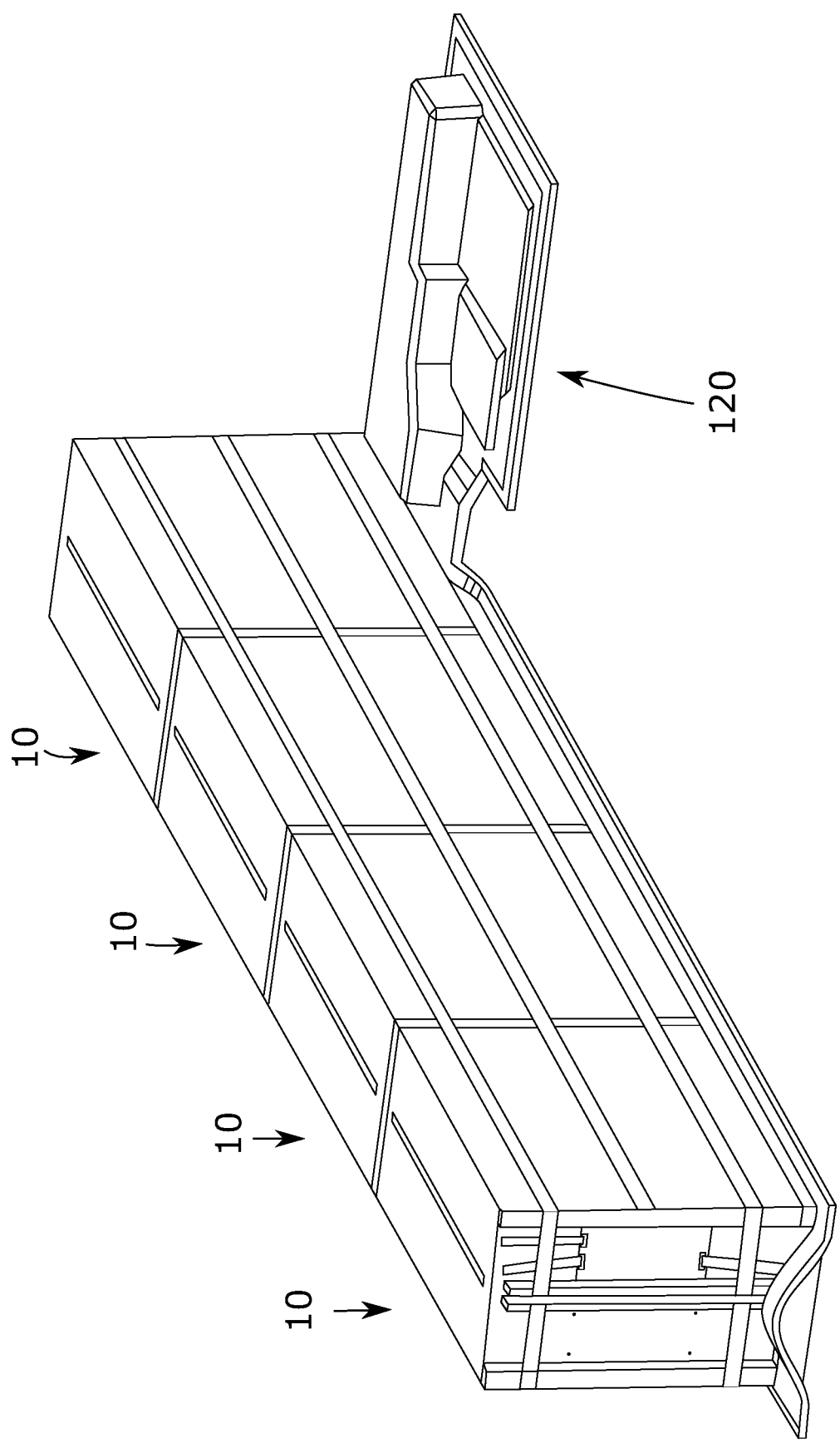
FIG. 5 is a plurality of systems of FIG. 4 positioned together end-to-end.
Figure 6:
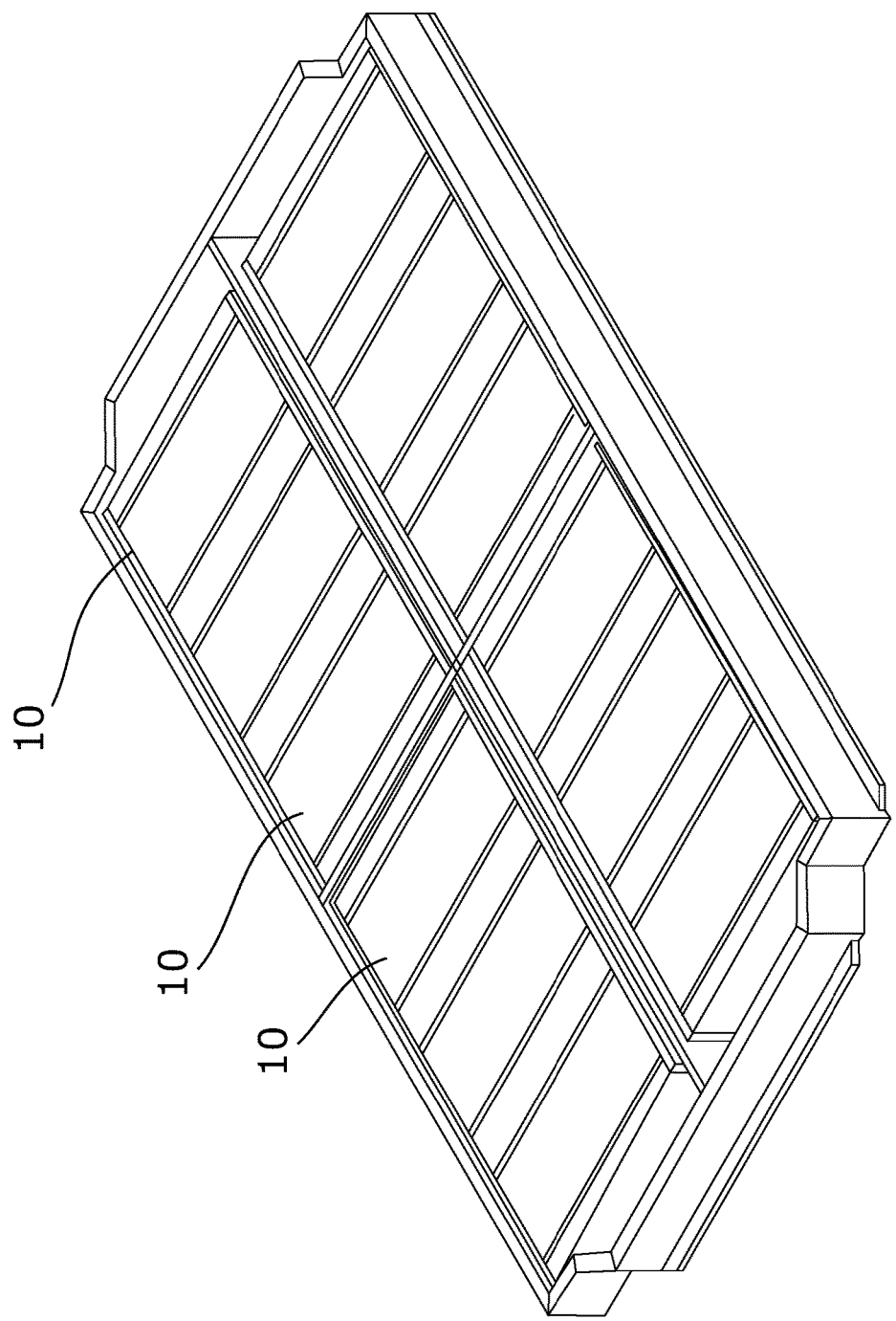
FIG. 6 is a perspective view of a plurality of the present systems positioned together in a tunnel arrangement along the center console.

As seen in FIG. 4, a pair of the present battery module devices 10 can be positioned together side-by-side with a cooling plate 100 therebetween. Cooling plate 100 functions similar to brackets 22 and 24 described above and may be made of the same material(s). Cooling plate 100 may optionally be made of aluminum with coolant circulating therein. Between the cooling plate and the modules there is enough thermal interface material to transfer heat from the module to the cooling plate. The advantage of the embodiment of the present system shown in FIG. 4 is simply that it provides more power (and meet a voltage range requirement) than the single embodiment shown in FIG. 1. The present design's modularity provides such advantages as various numbers of pouch cells 32/34 can be stacked in each of battery module devices 10 and various numbers of battery module devices 10 may in turn be stacked together. For example, as seen in FIG. 5, a plurality of four of the present systems as shown in FIG. 4 can be positioned together on top of a battery bottom enclosure 120. Lastly, as seen in FIG. 6, a plurality of battery module devices 10 can be positioned together as a flat floor battery pack that can be positioned in the chassis of an electric vehicle.

What is claimed is:

1. A battery module, comprising:
   a plurality of pouch cell modules positioned together side-by-side, wherein each pouch cell module comprises:
      a first bracket,
      a second bracket,
      a pair of cells positioned between the first and second brackets, and
      an insulation pad positioned between the pair of cells;
   a busbar electrically connecting the plurality of side-by-side pouch cell modules together;
   a pair of pressure plates, with one pressure plate of the pair of pressure plates disposed on one side of the battery module and one other pressure plate of the pair of pressure plates plate disposed on one other side of the battery module;
   at least one compression band wrapped around the plurality of side-by-side pouch cell modules and the pair of pressure plates;
   a top cover spanning across each top of the plurality of side-by-side pouch cell modules; and
   a bottom cover spanning across each bottom of the plurality of side-by-side pouch cell modules; and
   wherein each cell of the plurality of side-by-side pouch cell modules has a top tab and a bottom tab, and wherein top tabs of the pair of cells are fastened to each other and bottom tabs of the pair of cells are fastened to each other, said top tab extending in a different direction, relative to the cell, than the bottom tab, and wherein the top tab of one of the pair of cells is formed in an L-shape that extends across the insulation pad to make contact with the top tab of the other of the pair of cells and that extends away from the insulation pad to make contact with the busbar.

2. The battery module of claim 1, further comprising:
   a slave board connected to one of the pressure plates at an end of the battery module.

3. The battery module of claim 1, wherein the top cover has downwardly extending edges that wrap around top ends of each of the plurality of pouch cell modules, and the bottom cover has upwardly extending edges that wrap around bottom ends of each of the plurality of pouch cell modules.

4. The battery module of claim 1, wherein the at least one compression band comprises an upper compression band and a lower compression band both wrapping around the plurality of side-by-side pouch cell modules.

5. The battery module of claim 1, wherein the first and second brackets are made of aluminum.

6. The battery module of claim 1, wherein the insulation pad is made of a thermally insulating material.

7. The battery module of claim 1, wherein each cell has 36 batteries in a 3S4P or 3P12S or 48 cells in a 6P8S configuration.

8. The battery module of claim 1, further comprising: a voltage and temperature sensing board in electrical communication with each of the plurality of side-by-side pouch cells.

9. The battery module of claim 1, wherein the top tabs are separately fastened to each other from the bottom tabs.

10. The battery module of claim 9, wherein the busbar is welded to the top and bottom tabs of the cells.

11. The battery module of claim 1, wherein the first bracket has longitudinally extending side edges and the second bracket is positioned between the longitudinally extending side edges of the first bracket.

12. The battery module of claim 11, wherein the longitudinally extending side edges of the first brackets have notches therein and the at least one compression band is received into the notches.

13. An automotive battery, comprising:
   a plurality of pouch cell modules positioned together side-by-side, wherein each pouch cell module comprises a pair of cells separated by an insulation pad; a busbar electrically connecting the plurality of side-by-side pouch cell modules together; a pair of pressure plates, wherein each of the pressure plates are disposed on a side of the plurality of pouch cell modules;
   at least one compression band wrapped around the plurality of side-by-side pouch cell modules and the pair of pressure plates;
   a top cover spanning across each top of the plurality of side-by-side pouch cell modules; and
   a bottom cover spanning across each bottom of the plurality of side-by-side pouch cell modules; and
   wherein each cell of the plurality of side-by-side pouch cell modules has a top tab and a bottom tab, and wherein top tabs of the pair of cells are fastened to each other and bottom tabs of the pair of cells are fastened to each other, said top tab extending in a different direction than the bottom tab, and wherein the top tab of one of the pair of cells is formed in an L-shape that extends across the insulation pad to make contact with the top tab of the other of the pair of cells and that extends away from the insulation pad to make contact with the busbar.

14. The automotive battery of claim 13, further comprising a slave board connected to one of the pressure plates.

15. The automotive battery of claim 13, wherein the top cover has downwardly extending edges that wrap around top ends of each of the plurality of pouch cell modules, and the bottom cover has upwardly extending edges that wrap around bottom ends of each of the plurality of pouch cell modules.

16. The automotive battery of claim 13, wherein the at least one compression band comprises an upper compression band and a lower compression band both wrapping around the plurality of side-by-side pouch cell modules.

17. The automotive battery of claim 13, wherein the top tabs are fastened to each other separately from the bottom tabs.

18. The automotive battery of claim 17, wherein the busbar is welded to the top and bottom tabs of the cells.

19. The automotive battery of claim 13, wherein each of the pouch cell modules includes a first bracket that has longitudinally extending side edges and a second bracket positioned between the longitudinally extending side edges of the first bracket.

20. The automotive battery of claim 19, wherein the longitudinally extending side edges of the first brackets have notches therein and the at least one compression band is received into the notches.

* * * * *